(12) United States Patent
Brown et al.

(10) Patent No.: US 8,890,411 B2
(45) Date of Patent: Nov. 18, 2014

(54) COMPUTER CONTROLLED CONFIGURABLE LIGHTING SYSTEM FOR MODULAR VEHICLE LIGHTS

(75) Inventors: Alyn Brown, Indianapolis, IN (US); James Wiff, Cologne, MN (US)

(73) Assignee: Control Solutions LLC, Aurora, IL (US)

( * ) Notice: Subject to any disclaimer, the term of this patent is extended or adjusted under 35 U.S.C. 154(b) by 446 days.

(21) Appl. No.: 13/273,605

(22) Filed: Oct. 14, 2011

(65) Prior Publication Data

US 2013/0093324 A1 Apr. 18, 2013

(51) Int. Cl.
*B60Q 1/26* (2006.01)
*B60Q 1/14* (2006.01)
*B60Q 11/00* (2006.01)
*B60Q 1/18* (2006.01)
*B60Q 1/24* (2006.01)

(52) U.S. Cl.
CPC .......... *B60Q 1/1407* (2013.01); *B60Q 11/002* (2013.01); *B60Q 1/18* (2013.01); *B60Q 1/24* (2013.01)
USPC .............................................. 315/80; 315/77

(58) Field of Classification Search
USPC ................. 315/291, 224, 247, 307, 308, 312, 315/185 R, 76, 77, 78, 79, 80, 82
See application file for complete search history.

(56) References Cited

U.S. PATENT DOCUMENTS

| | | | |
|---|---|---|---|
| 5,010,459 A | 4/1991 | Taylor et al. | |
| 5,209,560 A | 5/1993 | Taylor et al. | |
| 5,329,431 A | 7/1994 | Taylor et al. | |
| 5,769,527 A | 6/1998 | Taylor et al. | |
| 5,984,494 A | 11/1999 | Chapman et al. | |
| 6,046,550 A * | 4/2000 | Ference et al. | 315/291 |
| 6,149,288 A | 11/2000 | Huang | |
| 6,252,358 B1 | 6/2001 | Xydis et al. | |
| 6,559,777 B1 | 5/2003 | Martin et al. | |
| 6,623,151 B2 | 9/2003 | Pederson | |
| 6,774,893 B2 | 8/2004 | Debiez et al. | |
| 6,814,459 B2 | 11/2004 | Pederson | |
| 6,859,644 B2 | 2/2005 | Wang | |
| 7,055,994 B2 | 6/2006 | Martin | |
| 7,064,674 B2 | 6/2006 | Pederson | |
| 7,128,450 B2 | 10/2006 | Tiesler et al. | |
| 7,217,020 B2 | 5/2007 | Finch | |
| 7,314,296 B2 | 1/2008 | Machi et al. | |
| 7,350,945 B2 | 4/2008 | Albou et al. | |

(Continued)

FOREIGN PATENT DOCUMENTS

JP 2230695 A 9/1990

*Primary Examiner* — Minh D A
(74) *Attorney, Agent, or Firm* — McCracken & Gillen LLC (57) ABSTRACT

A vehicle lighting control system and method are provided. The vehicle lighting control system includes a light module with light carrier positions for receipt of individual light sources. A lighting controller coupled with the light module is configured to identify a light source type associated with the individual light sources occupying light carrier positions of the light module. A power source coupled with the lighting controller provides power to the individual light sources in accordance with the type of light source identified. The individual light sources are removable from the light module and may be replaced by other light sources of a different type. The lighting controller is adapted to be reconfigured such that the different type of light source associated with the other light sources is identified and power is provided to the other light sources in accordance with the different light source type identified.

27 Claims, 5 Drawing Sheets

(56) References Cited

U.S. PATENT DOCUMENTS

| | | |
|---|---|---|
| 7,434,970 B2 | 10/2008 | Machi et al. |
| 7,462,993 B2 | 12/2008 | Sotiriou |
| 2002/0043938 A1* | 4/2002 | Lys .............................. 315/149 |
| 2002/0145394 A1* | 10/2002 | Morgan et al. ................. 315/291 |
| 2002/0175641 A1* | 11/2002 | Andersen ....................... 315/312 |
| 2006/0146553 A1 | 7/2006 | Zeng et al. |
| 2011/0035404 A1* | 2/2011 | Morgan et al. ................. 707/769 |

* cited by examiner

COMPUTER CONTROLLED CONFIGURABLE LIGHTING SYSTEM FOR MODULAR VEHICLE LIGHTS

FIELD OF THE INVENTION

This invention relates to lighting systems for vehicles. More particularly, the invention relates to computer-based control systems that provide for different light configurations of a vehicle such as a security vehicle or a military combat vehicle.

BACKGROUND

For certain vehicles, such as security or military combat vehicles, it may be desirable to have different lighting configurations using different types of lights. For instance, different lighting configurations may be needed under various battlefield conditions versus standard night time operations. However, certain conventional vehicle mounted lighting fixtures such as in various military combat vehicles employ a fixed lighting configuration with a fixed number of lights and a fixed type of light occupying each light position. If a user desires to replace or swap out a first type of light with a second type of light, such conventional systems would require re-wiring because the combinations, positions and quantity of lights are fixed at the time of installation. In such military vehicles, the lights are hardwired into the vehicle power and switching the operation of the individual lights (or a light bar) is done via a hardwired control panel and individual switches in the cabin of the vehicle. Consequently, replacement of lighting, in such vehicles, requires rewiring to connect a new lighting fixture to a control panel.

Accordingly, there is a need for a vehicle lighting system that provides for lighting configuration and different modes of operation in a convenient manner.

SUMMARY

A vehicle lighting control system and method are provided. The vehicle lighting control system includes a light module with light carrier positions for receipt of individual light sources. A lighting controller coupled with the light module is configured to identify a light source type associated with the individual light sources occupying light carrier positions of the light module. A power source coupled with the lighting controller provides power to the individual light sources in accordance with the type of light source identified. The individual light sources are removable from the light module and may be replaced by other light sources of a different type. The lighting controller is adapted to be reconfigured such that the different type of light source associated with the other light sources is identified and power is provided to the other light sources in accordance with the different light source type identified.

The lighting module, for example, may be mounted to a military combat vehicle in which the types of light sources selectively installed, removed, and replaced at the light module may include light emitting diode (LED) lights, infrared (IR) lights, high intensity discharge (HID) lights, or incandescent lights. The power source may be selected from vehicle power, a vehicle battery, or a back-up vehicle battery.

The vehicle lighting control system may include an operator interface that is coupled with the lighting controller in which the operator interface may be configured to program desired modes of operation for the light sources. The lighting controller is configured to associate a mode of operation with the individual light sources and the light sources operate in accordance with the mode of operation assigned. For instance, modes of operation may include light flashing, light intensity, number of lights on, night mode or combat mode of operation. The mode of operation assigned is mapped with the individual light sources and the lighting controller controls the lighting operations for each individual light source in accordance with the mode of operation assignment. The lighting controller is also configured to associate different modes of operation with other light sources. The light sources operate in accordance with their respective mode of operation assigned after replacing removed light sources at the light module. In certain applications, the lighting controller may sequence the application of power applied to individual light sources and send commands to a switching device associated with the light module to control power to the individual light sources.

Power may be provided through power lines installed between the power source, the lighting controller and the switching devices associated with the light modules. Communication signaling may also be provided over communication buses installed between the lighting controller, the switching devices and an operator interface. In some examples, the vehicle lighting control system may have both redundant power distribution and communication paths in which multiple paths of power and communications are provided to the light modules and allow the light modules to remain operational if a power or communication paths is interrupted. The location of the individual light sources may be mapped to addresses on the communication bus or addresses associated with registers in memory for the lighting controller.

The lighting controller receives inputted configuration information relating to the type, quantity and location of the light sources at the light modules. In one example, the configuration information may be mass loaded from a portable data memory device or a computer device, upon system startup, the lighting controller may initiate diagnostic health tests for the light sources. In some instances, light modules may send health status messages to the lighting controller which determines if the health of individual light sources is satisfactory. The lighting controller may modify (per predefined algorithms stored in memory) power control to the light modules to compensate for any damage assessed.

DETAILED DESCRIPTION

Figure 1:
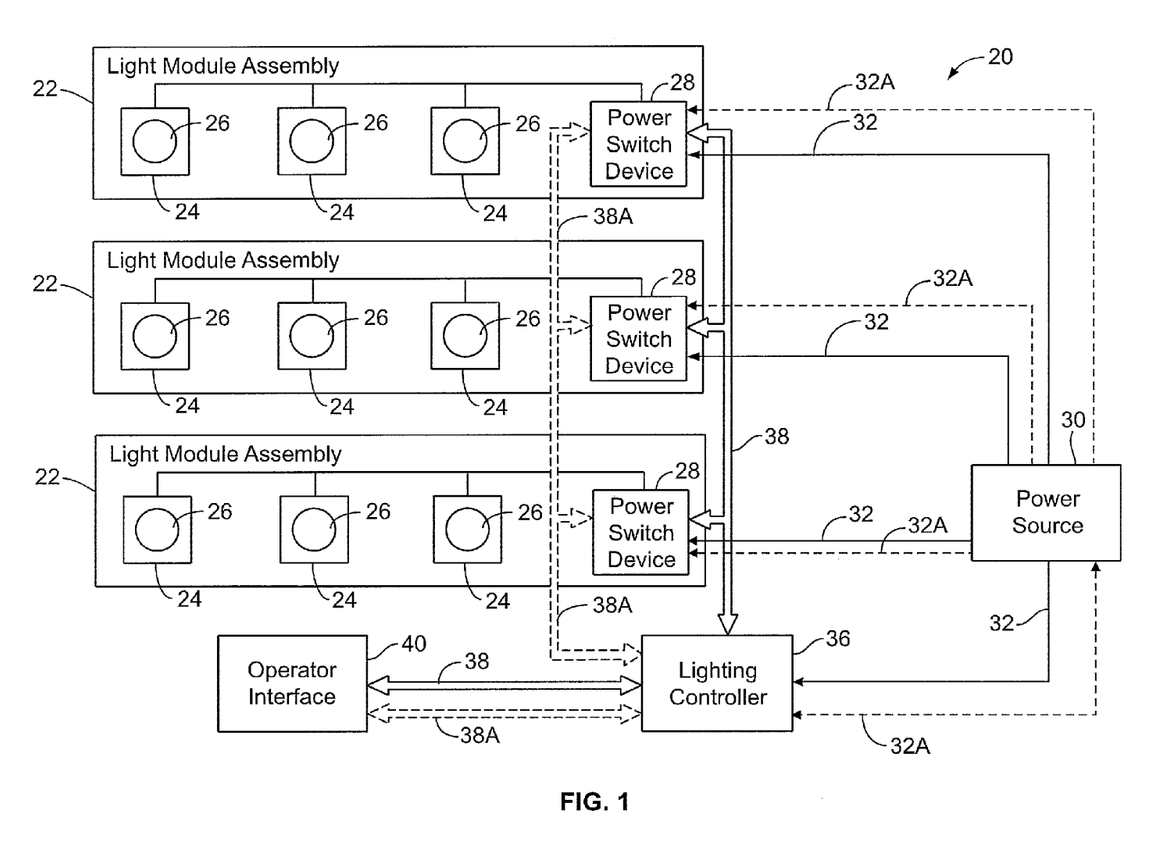
FIG. 1 is a system block diagram of a vehicle lighting control system.

Referring to FIG. 1, vehicle lighting control system 20 is shown having light module assemblies 22. The light module assemblies 22 have individual light carriers or fixtures 24 for the positioning of a plurality of individual light sources 26. In this example, the light carriers 24 of a light module assembly 22 are coupled with an associated switching device 28. Power from power source 30 is provided to each of the power switching devices 28. Power connection lines 32 may be coupled between the switching devices 28 and the light carriers 24 housing individual light sources 26 at each light module 22. Communication signals between switching devices 28 and lighting controller 36 are carried over communication bus 38. In this example, communication bus 38 also provides communication signaling between the lighting controller 36 and an operator interface 40. The power source 30 may also provide power to the lighting controller.

As seen, the vehicle lighting control system 20, in this example, includes one or more vehicle mountable light modules 22 that contain a plurality of removable and replaceable light sources 26. The light sources 26 may be a variety of types of lights and may be configured and reconfigured within the light carrier 24 of a light module 22 as desired without rewiring of the vehicle lighting control system. For example, the vehicle light sources may include LED lights, infrared (IR) lights, high intensity discharge (HID) lights, incandescent lights, or any other type of vehicle light for use in various lighting applications and modes of operation. The lighting controller 36 may include a microprocessor and associated memory for storing configuration software that accommodates reconfiguration of the different types of light sources positioned within the light modules. The light modules 22, in this example, may be designed to apply the highest power load required of the different types of powered light sources (such as large power load requirements of HID lights). The light modules 22 may further be mounted on a military combat vehicle such as a High Mobility Multipurpose Wheeled Vehicle (HMMWV, or "hummvee"), or any other vehicle that may require different lighting applications (e.g., operation modes in which it is desirable that the vehicle remains undetectable). For example, unmanned vehicles that may be controlled remotely during military or security/safety missions may be employed.

In the example system 20 seen in FIG. 1, light modules 22 include a number of light carrier positions 24 (e.g., three in this example) with each light carrier capable of supporting a single light source 26. A variety of different types of light sources (e.g., LED, IR, HID) may be coupled to the light module 22 in each light carrier position 24. Power from a power source 30 is coupled to each light module 22, which then distributes power to the light sources 26. Power switching devices 28 are coupled with and receive power from power source 30 for distribution to individual carrier positions 24 of the light modules 22. Communication between lighting controller 36 and the power switching devices 28 is carried over communication bus 38. In this example, switching devices 28 are associated with each light module 22; however, alternative arrangements may be selectively employed. The power switching devices 28 receive power from power source 30 and send and receive digital communication commands along communications bus 38. The power switching device 28, for example, may be a device that receives and decomposes digital switching command signals and may perform the physical activity of switching (on or off) relays associated with the individual light carrier positions 24. Communication along communication bus 38 is one of many suitable examples in which digital communication may be performed. Communications between operator interface 40, lighting controller 36, and power switching devices 28 associated with light modules 22 may be wired, wireless, along fiber optics or any other suitable digital communication form. In alternative arrangements, power and communications may be provided over the same bus, for example, with digital communications multiplexed over DC power lines. It is understood that power source 30 may be one or more power sources used to provide current to the light modules 22 and individual light sources 26. For instance, in some implementations the vehicle power may be used as a power source 30. Alternatively, a vehicle battery, back-up battery or other power source may be used.

The operator interface 40 in communication with lighting controller 36 is manipulated by the user/operator to prompt the execution of commands and display output to the user. Operator interface 40, for example, may be positioned at an operator control panel within a cabin of the vehicle and may provide hardware or software based switching to send signal commands over communication bus 38 to the lighting controller 36. The lighting controller 36 in conjunction with power switching devices 28 control operation of the lighting modules 22 and the respective light carrier positions 26 through communication bus 38. As seen in FIG. 1, vehicle lighting control system 20 is provided with redundant power distribution and communication paths for enhanced reliability of the system. More particularly, the system 20 is provided with two or more paths of vehicle power 32A and communication 38A to the light modules 22 which enable the light modules 22 to remain operational if one of the power paths or communication paths is interrupted.

The vehicle lighting control system 20 may be configured by a user initially installing the number of light modules 22 and the desired types of light sources 26 that will occupy the light carrier positions 24 of the light modules 22. The lighting modules 22 may be mounted directly to the vehicle. Power from the power source 30 and communications may be appropriately set up and wired between the light modules 22, power switch devices 28, lighting controller 36, and operator interface 40. As seen, after the vehicle lighting control system 20 is structurally assembled, the user may initiate the configuration software residing at lighting controller 36. The configuration software identifies the number of light modules 22 and modular light sources 26, and identifies the type of light source occupying each light carrier position 24 of the light modules 22. The configuration software may further provide user programmability through operator interface 40 and allow the user to program desired operation modes of the light sources 26 (e.g., number of light sources simultaneously turned on, flashing lights, light intensities, etc.).

The vehicle lighting control system 20 may be reconfigured without the need to rewire the system. In the vehicle lighting system 20, the user may change the types of light sources 26 occupying the light carrier positions 24 in the light modules as desired. For example, if a military combat vehicle is needed to perform an operation at night, it may be desireable to have all the light sources be IR lights, which would require replacement of all non-IR light sources in the light modules 22 with IR light sources. After all IR light sources have been installed in the lighting system 20, the configuration software is run. The configuration software identifies that all the light sources are IR lights and may prompt the user to program the desired mode of operation for the IR light sources (e.g., all lights on, half of lights on, etc.).

Figure 2:
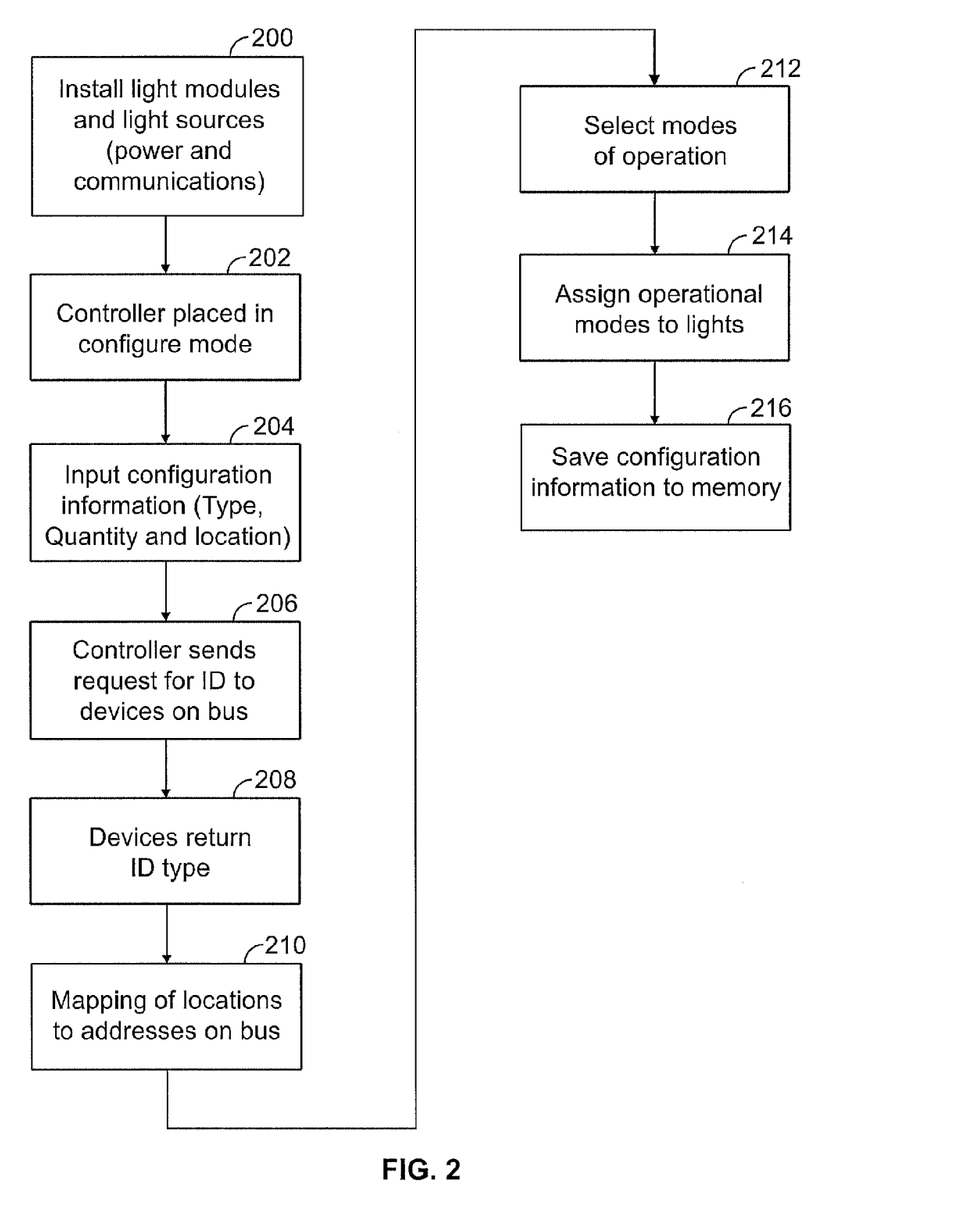
FIG. 2 is a flowchart setting forth example steps of setup and configuration for the vehicle lighting control system.

FIG. 2 is a flowchart setting forth example steps of setup and configuration for the vehicle lighting control system. Initially, physical installation of lighting components such as the light modules, modular light sources, power switch devices and lighting controller may be performed. In step 200, light modules 22 and individual light sources 26, are installed in the vehicle. Power and communications are also coupled between the lighting controller 36, power source 30, power switch devices 28, and light modules 22. For example, power lines 32, 32A may be installed for power coupling between power source 30 and the lighting controller 36 and switching devices 28 associated with the light modules 22. Communications set up may include installation of one or more communication buses 38, 38A between the lighting controller 36 the power switch devices 28 and the operator interface 40. Communication bus 38 may be any standard communication bus following communications protocols. For example, a CAN (controller area network) communications bus may be employed. Alternatively, MILCAN communication protocol for use in military vehicles, 1939 communication protocol for use in commercial vehicles, or any other communication protocol may selectively be used in association with communications bus 38.

Figure 5:
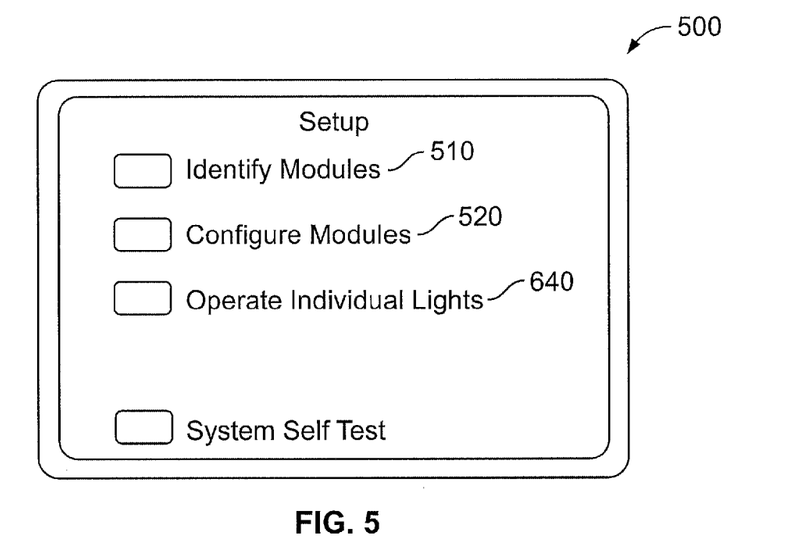
FIG. 5 illustrates an example operator interface screen display associated with system setup.

In step 202, lighting controller 36 is placed in configure mode. To place controller 36 in the configure mode, a user at operator interface 40 may select a setup interface screen 500 such as seen in FIG. 5. Selection of the setup interface screen 500, may be achieved, for example, through interaction with operation interface screen 600 seen in FIG. 6, and selecting the setup option 610. In step 204, configuration information is inputted to the system 20 relating to the type, quantity and location of the light sources 26 at light modules 22. This may be performed through selection of the "identify modules" option 510 at the setup interface screen 500, FIG. 5, appearing at the operator interface 40. Information relating to the lighting configuration may then be prompted and inputted to the system by the user. Alternatively, lighting configuration information may be mass-loaded from a portable data memory device or a computer device, such as in instances where several systems initially require the same lighting configuration.

The logical assignment of light source information to the physical light carrier locations at the light modules 22 proceeds to step 206. In step 206, lighting controller 36 sends a request for identification to the lighting devices (including light modules 22 with light carriers 24, light sources 26, and switching devices 28) on the communication bus 38. In step 208, the lighting devices (e.g., light modules 22 and individual light carrier ports 24) return identification (ID) information to the lighting controller 36. This information includes the type of each individual light source 26 located at the associated physical light carrier ports 24 at each light module 22. Information regarding the type of light source, and the quantity and location of the light sources at each light module is provided. In step 210, the configuration software, or alternatively the user, maps the locations of the light sources 26 installed at set up to the addresses on the communications bus 38. Alternatively, the addresses may be associated with locations or registers in memory for the lighting controller. To configure the light sources 26 at individual light source modules 22, the user may select the "configure modules" option 520 at the setup interface screen 500, FIG. 5, via operator interface 40. In another example, the configurability may be set by how many physical light carrier ports 24 each light module assembly 22 would physically hold, and in this instance, the configuration software would configure individual light sources based on knowledge of the physical hardwired positions at the light module assemblies. When a light module 22 is installed on a bus 38, the light module may broadcast its ID and configuration information to the bus on power-up. The lighting controller 36 receives this light module identification information and configuration information and logs it into memory as a valid light module 22. This information with the light position and knowledge of the physical arrangement of the light module assembly 22 allows the configuration software or user interacting with the controller 36 to configure the system 20.

Modes of operation are then assigned to the individual light sources 26 at the light module assemblies 22. In step 212, FIG. 2, modes of operation for individual light sources 26 at light modules 22 are selected. When configuring the individual light sources 26, modes of operation may be selected through the operations interface screen 600, FIG. 6. For instance, a night mode option 620, a blackout mode option 630, or any other mode of operation may be selected for association with a particular individual light source 26 at light module assemblies 22. In step 214, the lighting controller 36 assigns the selected modes of operation to the individual light sources 26 positioned at light carriers 24 of the module assemblies 22. In step 216, the configuration information is saved to memory associated with the lighting controller 36. The configuration of the vehicle lighting system 20 is to provide the appropriate operational mode for the intended use of the vehicle (e.g., different uses under different military combat situations). For example, in a selected and assigned "night" mode of operation, only HID type lights may be made available, while under a "blackout or covert" mode of operation all individual light sources in the system may be blocked out with only the potential of the lights being used.

In some embodiments, various levels of user access may be granted depending on the type of user. A field service user may, for example, have the ability to use preprogrammed modes of operation. A field service user may be granted further access to run diagnostics and pull logged information from the lighting controller 36 for off-board processing. Field service users, in some instances, may be able to reconfigure lighting and add additional modes of operation. Additionally, set up of pre-programmed modes of operations, running of internal diagnostics and operational tests relating to the manufacturing process may be performed during the manufacturing process. In some embodiments, the lighting controller 36 may also be able to "soft-start" the power demands by individual light sources 26 at light carrier positions 24 and light modules 22 to reduce the power demand associated with turning on all lights at the same time. By doing so, reduction of EMI/EMC power spikes on the vehicle power bus 32 may result and the overall surge capacity for the vehicle lighting control system 20 may be lowered.

Figure 3:
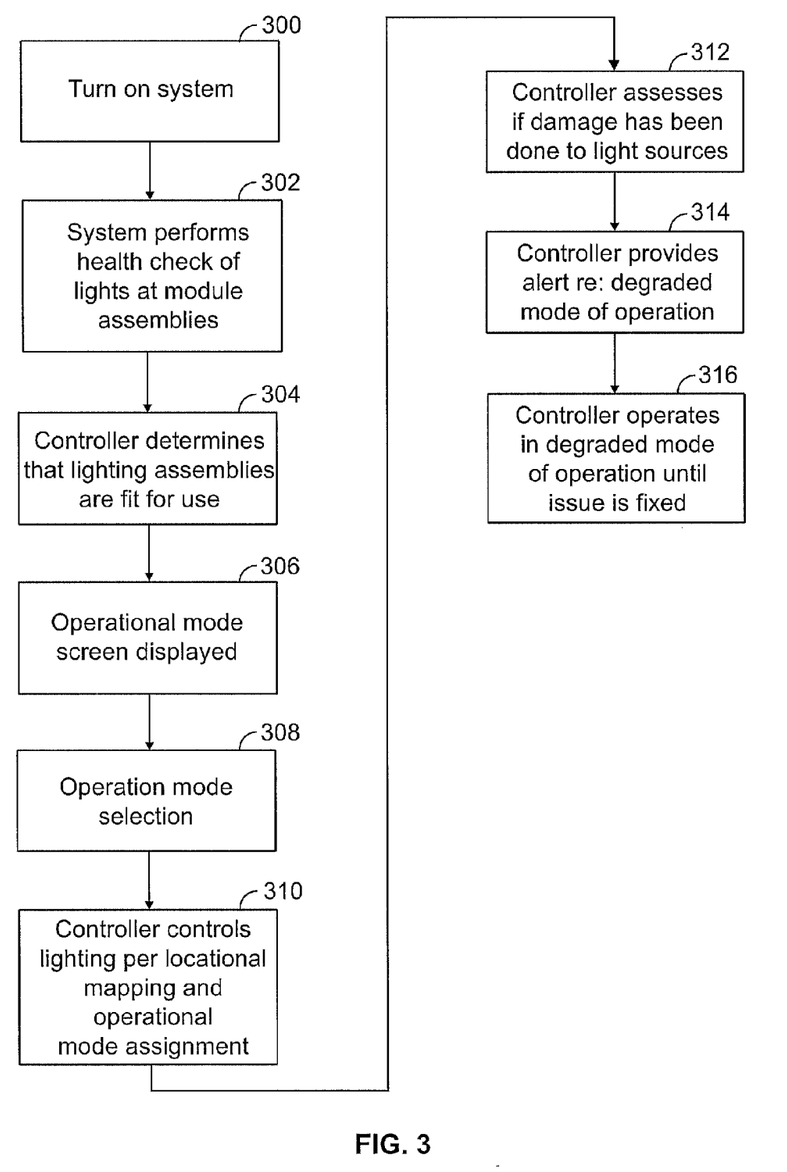
FIG. 3 is a flowchart setting forth example steps of system operation for the vehicle lighting control system.

FIG. 3 illustrates the steps of system startup and operation at the vehicle lighting control system 20. In step 300, the vehicle lighting control system 20 is turned on and initialized. In a normal mode of operation, the lighting controller 36 and operator interface 40 become active when power from power source 30 is applied or the system 20 is turned on. In step 302, lighting controller 36 initiates a health check for the light sources 26 positioned at lighting modules 22. The diagnostic health test steps performed at the vehicle lighting control system 20 are described with reference to FIG. 4. In general, the lighting controller 36 operating at vehicle lighting control system 20 performs a power-on self test (POST) to determine overall health, initiates a timer to record on-time, and logs information to the system memory at lighting controller 36.

Figure 6:
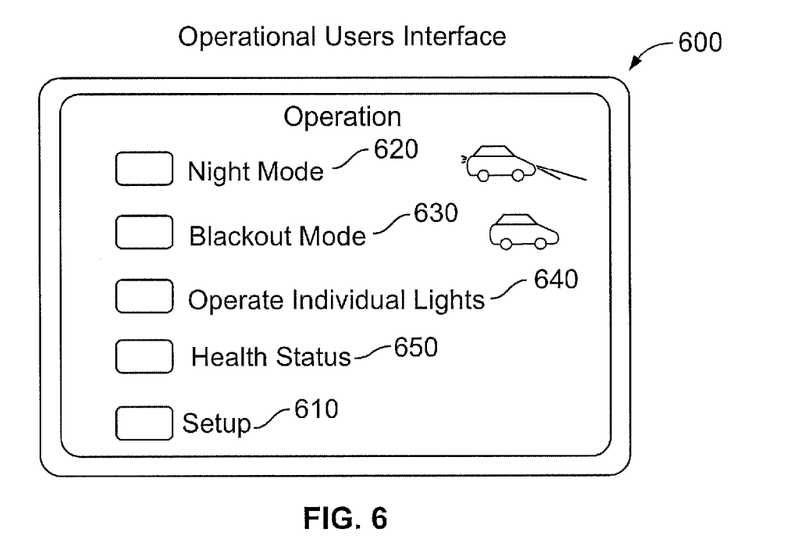
FIG. 6 illustrates an example operator interface screen display associated with system operation.

If the system meets the health check requirements, then in step 304 the lighting controller 36 informs the user via operator interface 40 that the lighting modules and light sources positioned therein are fit for use. Pre-programmed modes of operation may appear at operator interface 40. In step 306, an operational mode screen may be displayed at operator interface 40. For example, as seen in FIG. 6, an operational mode interface screen 600 may be displayed to the user listing various modes of operation. In this example, modes applicable to different lighting configurations for a military combat vehicle may be displayed, such as a night mode selection 620 or a blackout mode selection 630. A selection to operate individual light sources 640 may also be provided to allow the user to select light sources 26 for operation on an individual basis. A setup selection 610 may also be displayed to allow service personnel, having the appropriate authorization to conduct system setup, access to setup features and functions. In this instance, system setup display screen 500, FIG. 5, may be provided at operator interface 40 to allow for user system setup and configuration.

In step 308, selection of an operation mode is performed by the user selecting a desired mode from operational mode screen 600, FIG. 6. For example, in military combat vehicles, a user may perform a mode of operation selection (e.g., night mode or blackout mode) depending on the type of mission or a battlefield situation. In response to the mode of operation selection, the lighting controller 36 then maps the mode selection with the individual light sources 26 positioned at the light modules 22 as predetermined during the setup and configuration process. In step 310, the lighting controller 36 controls the lighting operation for each of the individual light sources 26 in accordance with the location mapping for each light source and the mode of operation assignment.

One example of associating individual light sources with particular operational configurations may involve vehicle light operations for a military combat vehicle. Example operations may include a normal operation mode, an infrared (IR) operation mode, or an HID (high intensity discharge) mode. In a normal operation, use of IR or HID light may be selectively turned on and off when desired. This may be used, in some instances, with vehicles that provide auxiliary lighting for night time service work in which flood lights may be used on the sides or rear of a vehicle. For personal transport vehicles or combat vehicles, light operation in normal mode may be controlled with the lighting controller 36 as an alternative to manual control through a dashboard switch. IR operation may be used with military combat vehicles under low observability circumstances and used on conjunction with users using IR equipment such as IR night vision equipment. In this example of IR operation, the HID lights may be locked out and the IR lights would be activated. HID operation may be used, for example, when military combat vehicles are in transport cross-country and there is minimal or no concern for enemy observability. HID lights could be used in conjunction with vehicle headlights or separately from the headlights.

In other examples, lighting control operations may be performed with unmanned vehicles. The light modules 22 may be mountable to remote-controlled unmanned vehicles with the configuration of lighting modes of operation for the light sources 26 performed remotely from the vehicle. For example, lighting modes of operation may selectively be controlled remotely by a stationary operator when employing remote-controlled unmanned vehicles. Reconfiguration of lighting operations may be performed as military or safety missions dictate. Lighting control may be implemented with the digital communications employed in the control of a remote-controlled unmanned vehicle. With different types of light sources present on a remote-controlled unmanned vehicle, different modes of operation for the light sources may be operated through software programming and communications. Lighting control may also be linked with stimulus-response actions with unmanned vehicles. In particular, the lighting controller 36 may provide power to individual light sources 26 of the remote-controlled unmanned vehicle in response to a stimulus-response action. For example, if the unmanned vehicle were performing perimeter security while using IR vision guidance (in a blackout mode) and the unmanned vehicle encounters a potential threat, the light sources may be controlled to illuminate the threat, alerting personnel of the intruder. Software control over the configuration and lighting operation via the lighting controller provides for advantageous modes of operation in both manned and unmanned vehicles.

In one example embodiment, the lighting controller 36 may initiate a "soft-start" of the light sources 26 by sequencing the application of power applied to the individual light sources 26. Power requirements often differ between the different types of light sources that may be used, such as IR lights, HID lights, incandescent lights, etc. Thus, lighting controller 36 sends commands to the switching devices 28 to control the application of power to the individual light sources 26. By separating the application of power to be applied to different types of light sources 26, this provides for a reduction of electrical current in-rush (and associated EMI/EMC) that occurs when several loads require power at a single instant in time. Managing the power load sequencing for the light sources 26 reduces the peak power needed for the light sources 26 in the system 20. In an alternative arrangement, the "soft start" operation of the light sources 26 may be modified to provide a modulated power signal to the light sources to act as a dimmer control.

During operation, the lighting controller 36 is called upon to monitor the system 20. The lighting controller 36 periodically communicates commands to the light modules 22 and checks the status of individual light sources 26 positioned at light carriers 24 of the light modules 22. Health or operational status information and descriptive information relating to the light sources 26 positioned at light modules 22 are sent from the light modules 22 and received at lighting controller 36.

Damage assessment and control is performed at the vehicle lighting control system 20. In step 312, lighting controller 36 assesses damage that has been done to individual light sources 26 at light modules 22. The lighting controller 36 logs this information into memory for future retrieval. Depending on the level of damage that may have occurred to the vehicle lighting system 20, the lighting controller 36 may send an alert message to the user at operator interface 40 that the system will operate at a degraded mode of operation in step 314. Lighting controller 36 assesses the damage based on the information received and controls the system 20 in a degraded performance mode. In step 316, lighting controller 36 operates in the degraded mode of operation until the damage at issue is addressed or repaired. At the end of an operation cycle, the lighting controller 36 creates post-operational summary information. The controller 36 updates life tables and time to fail information, as well as storing the post-operational summary information in memory for subsequent use and downloading.

Figure 4:
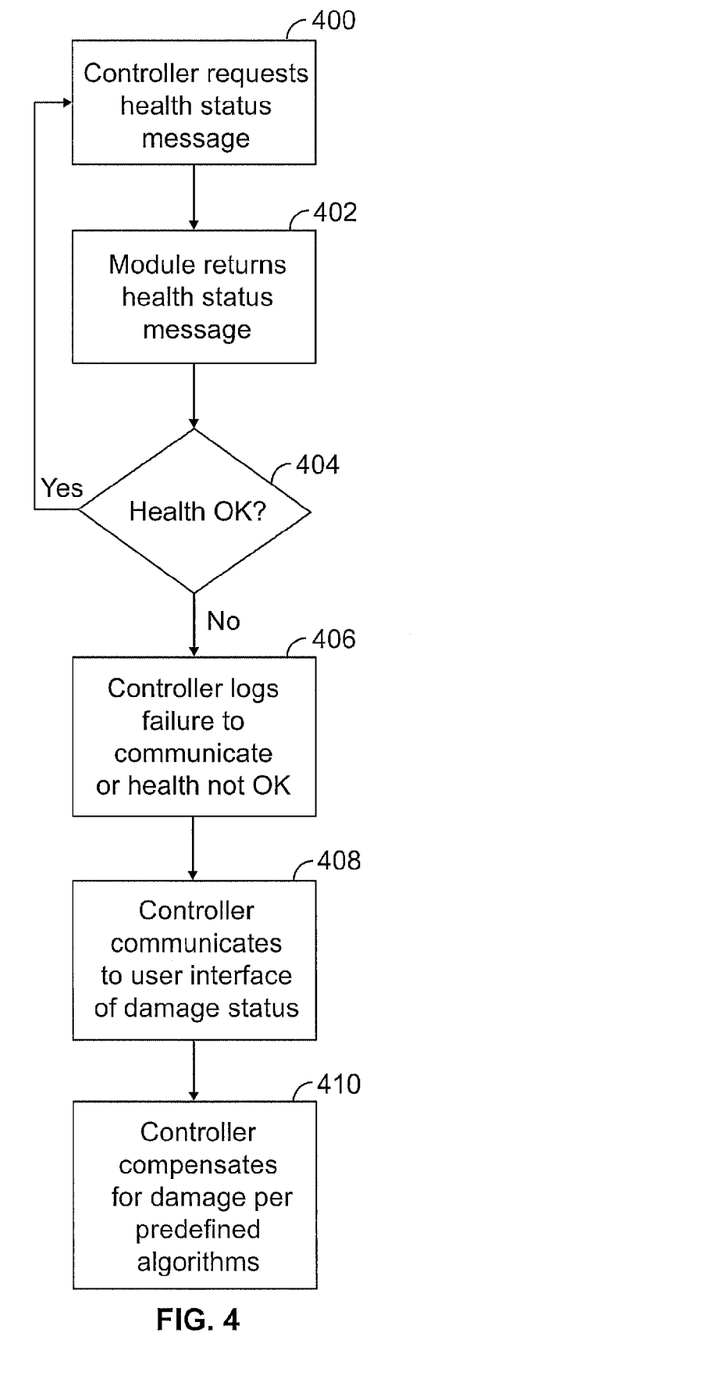
FIG. 4 is a flowchart setting forth example steps for diagnostic testing at the vehicle lighting control system.

FIG. 4 illustrates the steps performed for diagnostic testing for damage assessment and control at the vehicle lighting control system 20. In step 400, the lighting controller 36 requests a health status message. Request of a health status message may be automatically triggered by the lighting controller 36 or alternatively in response to user selection of a health status option 630 as seen in the example operation interface screen 600 of FIG. 6. In step 402, the light modules 22 housing individual light sources 26 return a responsive health status message to the lighting controller 36. In step 404, the lighting controller 36 determines if the health of the individual light sources 26 at the light modules 22 is satisfactory. If the health status message indicates that a light source 26 is satisfactory, then processing returns to step 400 in which the lighting controller 36 sends out periodic heath status message requests. If the lighting controller 36, determines that health status requirements have not been met, then in step 406 the lighting controller 36 logs a failure to communicate or an operation "unhealthy" message in memory for association with the light carrier 24 and/or the respective light source 26 at the light module 22 that received a health status request message. In step 408, the lighting controller 36 communicates the damage status for the particular light source 22 to the operator interface 40. In step 410, the lighting controller 36 modifies power control to the appropriate light module assembly 22 to compensate for the damage assessed per predefined algorithms stored in memory at the controller 36.

In an alternative arrangement, each lighting module assembly 22 may be programmed to send a health status message to the lighting controller 36 at periodic intervals (e.g., every 10 seconds). In this arrangement, the lighting controller 36 may keep a watchdog timer on each light carrier 24 or light source of a lighting module assembly 22 to determine whether it is operational. If the lighting controller 36 fails to receive a status message from a light module 22, the lighting controller 36 initiates additional communication attempts with the light module 22. After a predetermined number of communication attempts and no return messaging, the lighting controller 36 may assume that the lighting module is down and take corrective action in accordance with predefined algorithms stored in memory.

As seen, the vehicle lighting control system provides the ability to pre-configure lighting functions for various operational modes. This may be beneficial for many types of vehicles, such as military combat vehicles. Different types of lighting configurations may be constructed without hard-wiring limitations of conventional systems. When conducting military night operations, the system may, for example, be pre-configured to lock-out the light sources from inadvertent activation in order to prevent visibility of the vehicles from enemy attackers during combat missions. Real-time battle assessment of lighting capabilities and health status information upon system start-up may be achieved. Centralized lighting control for use in manned or un-manned vehicles used in battlefield operations may further be achieved.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention. The invention illustratively disclosed herein suitably may be practiced in the absence of any element, part, step, component, or ingredient, which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A vehicle lighting control system, comprising:
a light module having a plurality of light carrier positions for receipt of individual light sources;
a lighting controller coupled with the light module, the lighting controller configured to identify a type of light source associated with the individual light sources occupying light carrier positions of the light module;
the lighting controller coupled with a power source for providing power to the individual light sources in accordance with the type of light source identified;
the light module adapted to receive other light sources of a different type upon removal of the individual light sources; and
the lighting controller adapted to be reconfigured such that the different type of light source is identified and wherein power is provided to the other light sources in accordance with the different type of other light source identified, wherein the lighting controller is configured to associate a mode of operation with the individual light sources such that the individual light sources operate in accordance with the mode of operation assigned, and wherein the lighting controller is configured to associate a different mode of operation with the other light source such that the other light sources operate in accordance with the different mode of operation upon replacement of the individual light sources with the other light sources at the light module.

2. The vehicle lighting control system of claim 1 wherein the light module is mounted to a military combat vehicle.

3. The vehicle lighting control system of claim 2 wherein the power source is selected from at least one of (a) vehicle power; (b) vehicle battery; and (c) back-up vehicle battery.

4. The vehicle lighting control system of claim 1 further comprising an operator interface coupled with the lighting controller wherein the operator interface is configured to program desired modes of operation.

5. The vehicle lighting control system of claim 1 further comprising at least one set of power lines installed between the power source, the lighting controller, and a switch device associated with the light module; and
at least one set of communication buses installed between the lighting controller, the switching device and an operator interface.

6. The vehicle lighting control system of claim 5 wherein locations of individual light sources are mapped to addresses on the communications bus or registers in memory.

7. The vehicle lighting control system of claim 1 further comprising redundant power distribution and communication paths wherein two or more paths of power and communications are provided to the light module such that the light module remains operational if one of the power paths or communication paths is interrupted.

8. The vehicle lighting control system of claim 1 wherein the mode of operation assigned is mapped with the individual light sources and wherein the lighting controller controls the lighting operations for each individual light source in accordance with the location mapping for each light source and mode of operation assignment.

9. The vehicle lighting control system of claim 1 wherein configuration information relating to the type, quantity and location of the light sources at the light module is inputted to the lighting controller.

10. The vehicle lighting control system of claim 9 wherein the configuration information is mass loaded from a portable data memory device or a computer device.

11. The vehicle lighting control system of claim 1 further comprising a plurality of light modules each capable of holding a plurality of light sources.

12. The vehicle lighting control system of claim 1 wherein the lighting controller sequences the application of power applied to the individual light sources and sends commands to the switching device to control the power to the individual light sources.

13. The vehicle lighting control system of claim 1 wherein the lighting controller initiates a diagnostic health test for the light sources upon system start-up.

14. The vehicle lighting control system of claim 13 wherein the light module sends a health status message to the lighting controller, the lighting controller determines if the health of the individual light sources is satisfactory and modifies power control to the light module to compensate for damage assessed per predefined algorithms stored in memory.

15. A method of operating a vehicle lighting control system, comprising:
 providing individual light sources at a light module having a plurality of light carrier positions;
 utilizing a lighting controller for identifying a type of light source associated with the individual light sources occupying light carrier positions of the light module;
 providing power to the individual light sources in accordance with the type of light source identified;
 removing the individual light sources from the light module and replacing them with other light sources of a different type;
 reconfiguring the lighting controller such that the different type associated with the other light source is identified;
 providing power to the other light sources in accordance with the different type of other light source identified;
 assigning a mode of operation associated with the individual light sources;
 operating the individual light sources in accordance with the mode of operation assigned;
 assigning a different mode of operation associated with the other light sources after the individual light sources are removed from the light module; and
 operating the other light sources in accordance with the different mode of operation.

16. The method of claim 15 further comprising mounting the light module to a military combat vehicle.

17. The method of claim 16 wherein power is provided to the lighting module from a power source, the power source selected from at least one of (a) vehicle power; (b) vehicle battery; and (c) back-up vehicle battery.

18. The method of claim 15 further comprising programming desired modes of operation through an operator interface coupled with the lighting controller.

19. The method of claim 15 further comprising installing power lines between the power source, the lighting controller and a switch device associated with the light module; and
 installing a communication bus between the lighting controller, the switch device and operator interface.

20. The method of claim 19 wherein locations of the individual light sources are mapped to addresses on the communications bus or registers in memory.

21. The method of claim 15 further comprising mapping the mode of operation assigned with the individual light sources; and
 wherein the lighting controller controls the lighting operation for each individual light source in accordance with the location mapping for each light source and mode of operation assignment.

22. The method of claim 15 further comprising inputting to the lighting controller configuration information relating to the type, quantity and location of the light sources at the light module.

23. The method of claim 22 wherein the configuration information is mass-loaded from a portable data memory device or a computer device.

24. The method of claim 15 further comprising providing a plurality of light modules each capable of holding a plurality of light sources.

25. The method of claim 15 wherein the lighting controller sequences the application of power applied to the individual light sources and sends commands to the switching device to control the power to the individual light sources.

26. The method of claim 15 wherein the lighting controller initiates a diagnostic health test for the light sources upon system start-up.

27. The method of claim 26 wherein the light module sends a responsive health status message to the lighting controller, the lighting controller determines if the health of the individual light sources is satisfactory and modifies power control to the light module to compensate for damage assessed per predefined algorithms stored in memory.

* * * * *